United States Patent
Masuda et al.

(10) Patent No.: US 11,195,546 B1
(45) Date of Patent: Dec. 7, 2021

(54) DATA STORAGE BEYOND A THRESHOLD TAPE POSITION

(71) Applicant: International Business Machines Corporation, Armonk, NY (US)

(72) Inventors: Setsuko Masuda, Tokyo (JP); Atsushi Abe, Ebina (JP); Tsuyoshi Miyamura, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/330,460

(22) Filed: May 26, 2021

(51) Int. Cl.
  *G11B 5/008* (2006.01)

(52) U.S. Cl.
  CPC .................. *G11B 5/00813* (2013.01)

(58) Field of Classification Search
  None
  See application file for complete search history.

(56) References Cited

U.S. PATENT DOCUMENTS

| | | | | |
|---|---|---|---|---|
| 4,321,635 A * | 3/1982 | Tsuyuguchi | ......... | G11B 15/005 360/72.2 |
| 5,587,789 A * | 12/1996 | Lee | ....................... | G11B 5/0086 386/205 |
| 9,235,347 B2 | 1/2016 | Klein et al. | | |
| 9,536,561 B1 * | 1/2017 | Hasegawa | .............. | G11B 27/28 |
| 10,067,700 B2 * | 9/2018 | Hasegawa | .............. | G06F 3/0622 |
| 10,282,427 B2 | 5/2019 | Iwanaga et al. | | |
| 10,453,485 B1 * | 10/2019 | Miyamura | ........... | G11B 27/107 |
| 10,698,867 B2 | 6/2020 | Amir et al. | | |
| 2003/0236660 A1 * | 12/2003 | Yoshimura | ......... | G11B 20/1252 704/201 |
| 2005/0117246 A1 * | 6/2005 | Sueki | ..................... | G11B 5/584 360/77.12 |
| 2015/0199980 A1 * | 7/2015 | Aoki | .................. | G11B 5/00817 360/78.02 |
| 2019/0079690 A1 * | 3/2019 | Asmussen | ............. | G06F 3/0641 |
| 2019/0171543 A1 * | 6/2019 | Nylander-Hill | ..... | G06F 11/0775 |
| 2020/0159433 A1 * | 5/2020 | Miyamura | ........... | G06F 16/901 |

FOREIGN PATENT DOCUMENTS

| | | |
|---|---|---|
| JP | 2005182514 A | 7/2005 |
| JP | 2016053895 A | 4/2016 |

OTHER PUBLICATIONS

Mell et al., "The NIST Definition of Cloud Computing", Recommendations of the National Institute of Standards and Technology, Sep. 2011, 7 pages.

* cited by examiner

*Primary Examiner* — Peter Vincent Agustin
(74) *Attorney, Agent, or Firm* — Jamar K. Ray

(57) ABSTRACT

A method can include obtaining write information corresponding to an index to be written to a tape. The write information can include a target write position on the tape for the index. The method can include making a first determination that the target write position is beyond a threshold position on the tape. The method can include obtaining index information comprising a size of a full index stored on the tape. The method can include making a second determination that the size of the full index exceeds a size of one dataset. The method can include writing, in response to making the first determination and the second determination, the index to the tape. The writing can be in a first position beyond the threshold position. The index can be an incremental index.

20 Claims, 6 Drawing Sheets

DATA STORAGE BEYOND A THRESHOLD TAPE POSITION

BACKGROUND

The present disclosure relates to tape storage, and more specifically, to data storage to a tape beyond a threshold tape position.

File systems can control the storage of data onto tapes. Such filesystems can be configured to write data to tapes in a variety of formats.

SUMMARY

According to embodiments of the present disclosure, a method can include obtaining write information corresponding to an index to be written to a tape. The write information can include a target write position on the tape for the index. The method can include making a first determination that the target write position is beyond a threshold position on the tape. The method can include obtaining index information comprising a size of a full index stored on the tape. The method can include making a second determination that the size of the full index exceeds a size of one dataset. The method can include writing, in response to making the first determination and the second determination, the index to the tape. The writing can be in a first position beyond the threshold position. The index can be an incremental index.

A system and a computer program product corresponding to the above method are also included herein.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
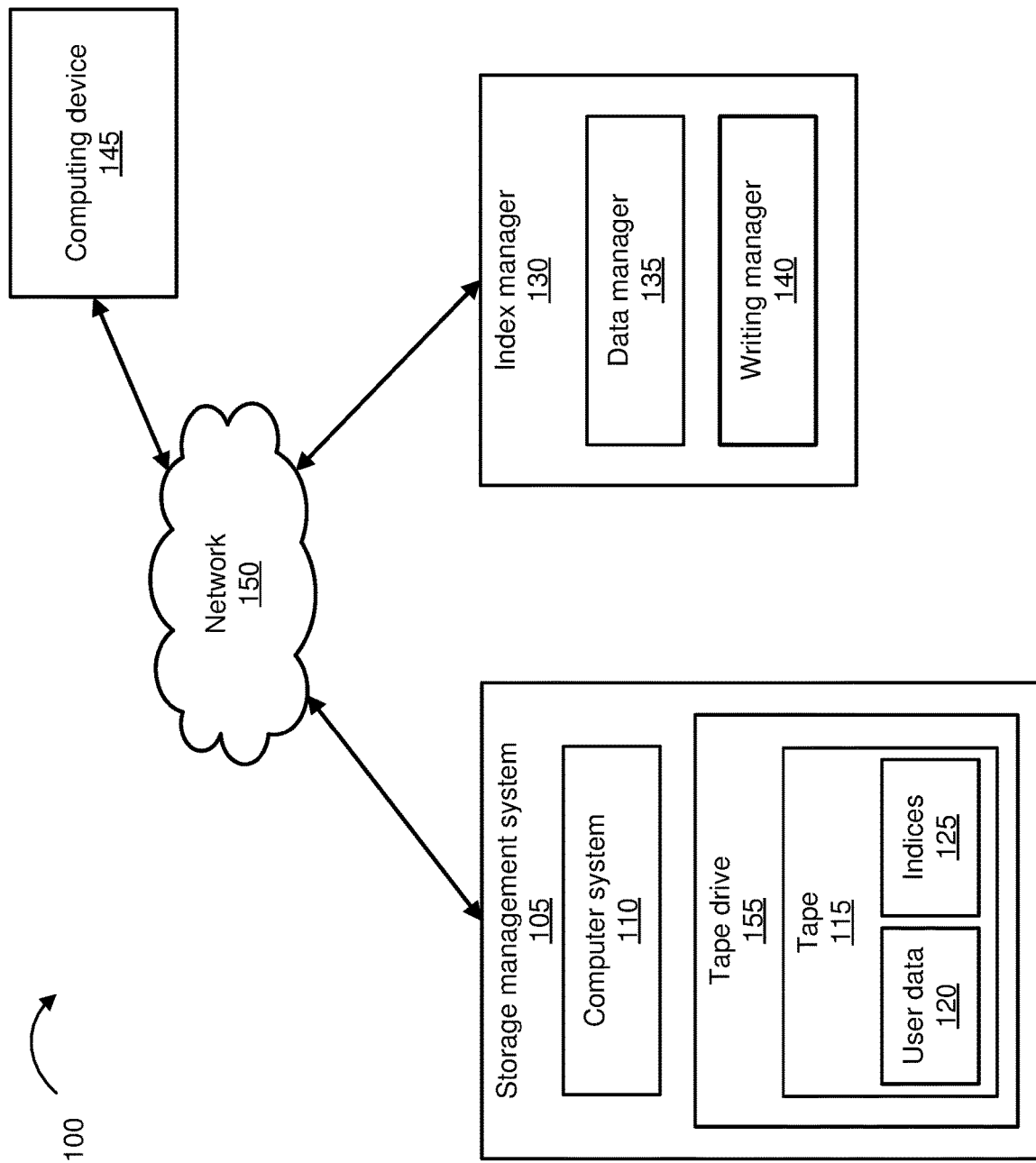
FIG. 1 depicts an example computing environment having an index manager, in accordance with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to tape storage; more particular aspects relate to data storage to a tape beyond a threshold tape position. While the present disclosure is not necessarily limited to such applications, various aspects of the disclosure may be appreciated through a discussion of various examples using this context.

A storage management system can control the writing of data to a tape, such as magnetic tape media, for storage. Data written to a tape can include user data, such as electronic documents and images, and metadata, such as information about user data (e.g., file names, information about storage positions of files on the tape, and the like). In some instances, the storage management system can prevent data written to the tape from being overwritten. In such instances, the storage management system can complete operations such as deleting or modifying data written to the tape by appending user data and/or metadata. For example, the storage management system can complete operations such as creating a new user data or modifying stored user data by appending the user data written to the tape. In another example, the storage management system can complete operations such as deleting and renaming user data by appending the metadata written to the tape.

A file into which metadata is written can be referred to as an index. In some instances, a storage management system can write a full index to a tape, and in some instances, a storage management system can write an incremental index to a tape. A full index can include metadata corresponding to all of the files stored on the tape; whereas, an incremental index can only include information about changes to previously written metadata. Thus, an incremental index can have a smaller size than a full index and can thereby consume less storage capacity on a tape. However, when retrieving metadata from incremental indices, the storage management system can expend more time performing computations and/or seek operations than it would retrieving metadata from full indices.

A storage management system can write data to a tape in units called datasets. In an example, the capacity of one dataset can be approximately 10 megabytes (MB). Thus, in this example, when writing data such as a 50 MB full index to a tape, the storage management system can write 5 datasets of data to the tape. Further in this example, when writing data such as a 2 MB incremental index to a tape, the storage management system can write one dataset of data to the tape. In the latter case, although the incremental index has a size of 2 MB, the storage management system nonetheless writes one dataset (approximately 10 MB of data) to the tape, as one dataset is the smallest unit of data that can be written to the tape. Accordingly, the one dataset written by the storage management system can include the 2 MB incremental index and approximately 8 MB of invalid data (e.g., random data written to fill the remaining storage capacity of a dataset).

In some instances, a storage management system can recognize a predetermined threshold position on the tape, and after such threshold position, permit only full indices to be written to the tape. By doing so, the storage management system can reduce the likelihood that it will reach the end of tape before it finishes writing data to the tape. For example, in some instances, a storage management system can employ a programmable early warning (PEW) location. The PEW location can be a user-selected position on the tape configured to indicate that the tape has limited remaining storage space. In an example, when a tape head of the storage management system reaches the PEW location, the storage management system can be configured to permit only full indices to be written to the tape beyond the PEW location. Accordingly, in this example, after the PEW location is reached, the storage management system can perform operations such as deleting and renaming user data, as these operations can be completed by writing metadata to the tape into full indices beyond the PEW location. However, in this example, after the PEW location is reached, the storage management system can be prevented from performing operations such as creating new user data and modifying stored user data, as these operations would include writing user data to the tape beyond the PEW location.

Such use of full indices beyond a threshold position on the tape can include various challenges. For example, repeated processes involving appending metadata can result in numerous large full indices, each occupying a plurality of datasets, being written to the tape. As a result, the storage management system could prematurely reach the maximum storage capacity of the tape, causing the tape to have a read-only status. In the read-only status, no data can be written to the tape, which can result in issues such as an inability to unmount the tape (e.g., an inability to remove the tape from management and/or control of storage management system) and/or an inability to synchronize data stored on the tape.

To address these and other challenges, embodiments of the present disclosure include an index manager. The index manager can facilitate efficient storage of data to a tape by a storage management system. More specifically, in some embodiments, the index manager can determine whether the storage management system writes data to a tape as a full index or an incremental index, based on information such as a target write position on the tape, a size of a full index stored on the tape, a number of incremental indices stored on the tape, and/or whether an unmount operation is initiated for the tape. Accordingly, by facilitating efficient storage of data to the tape, embodiments of the present disclosure can reduce a likelihood that a storage management system will prematurely reach a maximum storage capacity of the tape.

Turning to the figures, FIG. 1 illustrates a computing environment 100 that includes one or more of each of a storage management system 105, an index manager 130, a computing device 145, and/or a network 150. In some embodiments, at least one storage management system 105, index manager 130, and/or computing device 145 can exchange data with at least one other through the at least one network 150. For example, in some embodiments, at least one index manager 130 can exchange data with at least one storage management system 105 through the at least one network 150. One or more of each of the storage management system 105, index manager 130, computing device 145, and/or network 150 can include a computer system, such as the computer system 401 discussed with respect to FIG. 4.

In some embodiments, the index manager 130 can be a software application installed on at least one of the computing device 145 and/or the computer system 110. In some embodiments, the index manager 130 can be integrated into one or more software applications installed on at least one of the computing device 145 and/or the computer system 110 (e.g., the index manager 130 can be included as a plug-in software component of a software application installed on the computer system 110). The index manager 130 can include program instructions implemented by a processor, such as a processor of the computer system 110, to perform one or more operations discussed with respect to FIG. 2.

In some embodiments, the index manager 130 can include one or more modules, such as a data manager 135 and/or a writing manager 140. In some embodiments, the data manager 135 and the writing manager 140 can be integrated into a single module. In some embodiments, the data manager 135 can obtain, analyze, store, and/or initiate storage of data. In some embodiments, the writing manager 140 can issue commands to the storage management system 105 to write data to a tape 115. In some embodiments, the data manager 135 and/or the writing manager 140 can include program instructions implemented by a processor, such as a processor of the computer system 110 to perform one or more operations discussed with respect to FIG. 2. For example, in some embodiments, the data manager 135 can include program instructions to perform operations 205-225, 235, and 245, FIG. 2. In some embodiments, the writing manager 140 can include program instructions to perform operations 230 and 240, FIG. 2.

In some embodiments, the storage management system 105 can include at least one computer system 110, tape drive 155, and tape 115. In some embodiments, the computer system 110 of the storage management system 105 can command the tape drive 155 to write user data 120 and/or indices 125 (e.g., full indices and/or incremental indices) to the tape 115.

In some embodiments, computing device 145 can include a device, such as a desktop or notebook computer through which a user can input information and/or issue commands to the storage management system 105. In some embodiments, the network 150 can be a wide area network (WAN), a local area network (LAN), the Internet, or an intranet. In some embodiments, the network 180 can be substantially similar to, or the same as, cloud computing environment 50 discussed with respect to FIG. 5.

Figure 2:
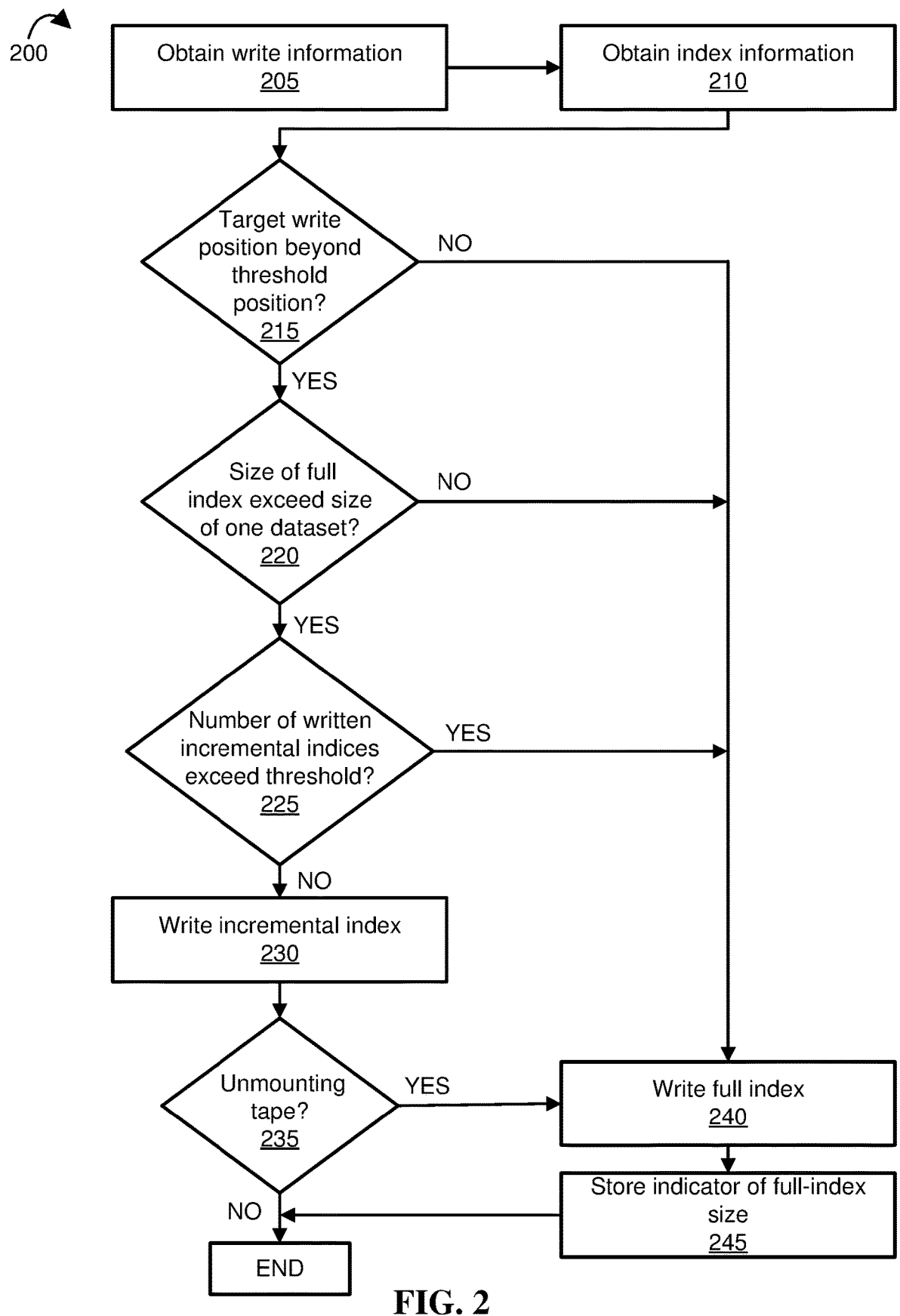
FIG. 2 depicts a flowchart of an example method for writing indices to a tape, in accordance with embodiments of the present disclosure.

FIG. 2 illustrates a flowchart of an example method 200 for writing indices to a tape, in accordance with embodiments of the present disclosure. The method 200 can be performed by an index manager, such as the index manager 130, FIG. 1.

Referring back to FIG. 2, in operation 205, the index manager can obtain write information. In some embodiments, write information can include a size of one dataset, a target write position of the storage management system, an indication for unmounting the tape, and/or a threshold position on the tape.

A size of one dataset can indicate a size of one unit of data that the storage management system can write to a tape. For example, in some embodiments, one dataset can be a minimum quantity of data (e.g., approximately 10 MB) that the storage management system can write to a tape. In some embodiments, a specification of the tape drive of the storage management system can determine the size of one dataset.

A target write position can include a position on the tape where the storage management system will initiate a forthcoming write operation. For example, in some embodiments, a target write position can be a position on the tape where a tape head of the storage management system will begin writing the next quantity of data, such as an index, to be stored to the tape. The target write position can indicate a longitudinal distance along the tape between the beginning of the tape and the end of the tape, such as 10 meters (m) before the end of the tape.

An indication for unmounting the tape can include data representing a command to unmount the tape. For example, in some embodiments, a user of a computing device (e.g., computing device 145, FIG. 1) can issue a command to a storage management system (e.g., storage management system 105, FIG. 1) to unmount a tape (e.g., to remove a tape from its management and/or control). In this example, data such as a line of code, a variable setting, and the like, can represent the command to unmount the tape; such data can be an indication for unmounting the tape.

A threshold position on the tape can refer to a position on the tape that triggers a change in how data is written to the tape. In some embodiments, a threshold position indicates that the tape has limited remaining storage space; thus, to efficiently utilize the remaining storage space on the tape beyond the threshold position, the storage management system can be configured to write data to the tape differently beyond the threshold position than it does before the threshold position. For example, in some embodiments, such a threshold position can include a position selected by an entity, such as the storage management system or a user of the storage management system, beyond which the storage management system is permitted to write only one or more incremental indices or one or more full indices to the tape. Like the target write position, the threshold position can indicate a longitudinal distance along the tape between the beginning of the tape and the end of the tape, such as 3 m before the end of the tape.

In some embodiments, the index manager can obtain write information in response to a command to unmount the tape or a command to modify data stored on the tape. For example, in some embodiments, a user can issue a command to the storage management system to delete or rename a file stored on the tape. In response, the index manager can obtain write information, such as a target write position, from the storage management system. In some embodiments, the index manager can obtain write information from a storage management system, such as storage management system 105, FIG. 1. In some embodiments, the index manager can obtain write information from a computing device, such as computing device 145, FIG. 1.

In operation 210, the index manager can obtain index information. In some embodiments, index information can include a size of a full index written to a tape, a number of incremental indices written to a tape, and/or a threshold corresponding to a number of incremental indices written to a tape. For example, in some embodiments, the index manager can obtain an indicator of the size (e.g., the quantity of megabytes) of the last full index that was written to the tape by the storage management system. As discussed in more detail below, the size of a full index previously written to the tape can indicate an approximate size of a subsequent full index to be written to the tape.

In some embodiments, the index manager can obtain index information in response to obtaining write information in operation 205. In some embodiments, the index manager can obtain index information from a storage management system, such as storage management system 105, FIG. 1. In some embodiments, the index manager can obtain index information from a computing device, such as computing device 145, FIG. 1.

In operation 215, the index manager can determine whether a target write position is beyond a threshold position on the tape. For example, in some embodiments, in operation 215, the index manager can compare the target write position and the threshold position obtained in operation 205 and determine which is closer (e.g., has a shorter longitudinal distance) to the end of the tape. If the target write position is closer to the end of the tape than the threshold position, then the target write position is beyond the threshold position; otherwise, the target write position is not beyond the threshold position. For example, if the target write position is 2 m from the end of the tape, and the threshold position is 5 m from the end of the tape, then the target write position is beyond the threshold position.

In operation 215, if the target write position is beyond the threshold position, then the index manager can proceed to operation 220. Alternatively, if the target write position is not beyond the threshold position, then the index manager can proceed to operation 240. Thus, in operation 215, embodiments of the present disclosure can proceed to writing a full index, which can potentially be larger in size than an incremental index, in response to determining that the target write position is not beyond the threshold position. Such a determination can indicate that there may be sufficient remaining storage space on the tape to write the potentially larger full index. Alternatively, embodiments of the present disclosure can proceed toward potentially writing an incremental index, which can be smaller in size than a full index, in response to determining that the target write position is beyond the threshold position. Such a determination can indicate that there is limited remaining storage space on the tape; thus, the storage management system should efficiently utilize the remaining storage space on the tape.

In operation 220, the index manager can determine if the size of a full index stored to the tape exceeds the size of one dataset corresponding to the tape (e.g., a minimum quantity of data that the storage management system can write to the tape). In some embodiments, operation 220 can include the index manager analyzing an indicator of the size (e.g., the quantity of megabytes) of the last full index that was written to the tape by the storage management system. The size of such a full index can indicate an approximate size of a subsequent full index to be written to the tape. In some embodiments, such an indicator can include data, such as a line of code, a variable setting (e.g., a TRUE/FALSE status of a variable), and the like, that represents whether the size of a full index stored to the tape exceeds the size of one dataset. In these embodiments, operation 220 can include the index manager interpreting the indicator to determine if the size of the full index stored to the tape exceeds the size of one dataset corresponding to the tape. In some embodiments, such an indicator can include the approximate size of a full index stored to the tape. In these embodiments, operation 220 can include the index manager comparing the approximate size of the full index stored to the tape to the approximate size of one dataset.

In operation 220, if the size of a full index stored to the tape exceeds the size of one dataset corresponding to the tape, then the index manager can proceed to operation 225. Alternatively, if the size of a full index stored to the tape does not exceed the size of one dataset corresponding to the tape, then the index manager can proceed to operation 240. Thus, in operation 220, embodiments of the present disclosure can proceed to writing a full index to the tape in the event that such writing would not exceed the minimum quantity of data that the storage management system would write to the tape. In such an event, writing either a full index or an incremental index could result in the storage management system writing one dataset to the tape; thus, writing the full index or the incremental index would equally affect the remaining storage space on the tape. Accordingly, in this event, writing the full index can be beneficial so that the storage management system can avoid the computation and metadata reconstruction operations that are associated with incremental indices.

In operation 225, the index manager can determine whether a number of incremental indices stored to the tape exceeds a threshold. In some embodiments, the number of incremental indices stored to the tape can include a count of consecutively stored/written incremental indices on the tape. In some embodiments, operation 225 can include the index manager comparing such a number to a threshold to determine whether the number exceeds the threshold. In some embodiments, the threshold can be selected by an entity such as the storage management system or a user of the storage management system. In some embodiments, the threshold can be selected to limit the number of consecutively written incremental indices stored to the tape. Because the number of computation and metadata reconstruction operations performed by the storage management system can increase as the number of consecutively written incremental indices stored to the tape increases, employing such a limit can prevent a continuous increase in the number of such operations. Accordingly, employing such a limit can permit the storage management system to operate more efficiently.

In operation 225, if the number of incremental indices stored to the tape exceeds the threshold, then the index manager can proceed to operation 240. Alternatively, if the number of incremental indices stored to the tape does not exceed the threshold, then the index manager can proceed to operation 230. Thus, in operation 225, embodiments of the present disclosure can proceed to writing a full index to the tape in the event that writing an incremental index may result in the storage management system performing an adverse number of computation and metadata reconstruction operations. Alternatively, in operation 225, embodiments of the present disclosure can proceed to writing an incremental index in the event that the advantage of writing an incremental index having a smaller size than a full index outweighs the disadvantage of potentially increasing the number of computation and metadata reconstruction operations performed by the storage management system.

In an example of operation 225, in some embodiments, a user can select a threshold of 8. In this example, in response to the index manager determining that the storage management system has written 9 consecutive incremental indices to the tape, the index manager can command the storage management system to write a full index to the tape.

In operation 230, the index manager can issue a command to the storage management system and/or a tape drive of the storage management system to write an incremental index to the tape. For example, in some embodiments, operation 230 can include the index manager transmitting an electronic message to the storage management system instructing the storage management system to write an incremental index to the tape at, or proximate to, the target write position on the tape.

In operation 235, the index manager can determine whether an indication for unmounting the tape was obtained in operation 205. If the index manager obtained such an indication, then the index manager can proceed to operation 240. Alternatively, if the index manager did not obtain such an indication, then the method 200 can end.

In operation 240, the index manager can issue a command to the storage management system and/or a tape drive of the storage management system to write a full index to the tape. For example, in some embodiments, operation 240 can include the index manager transmitting an electronic message to the storage management system instructing the storage management system to write a full index to the tape at, or proximate to, the target write position on the tape.

In operation 245, the index manager can store an indicator of the size of a full index written to the tape, such as the full index written in operation 240. In some embodiments, after operation 245, the method 200 can end.

Figure 3:
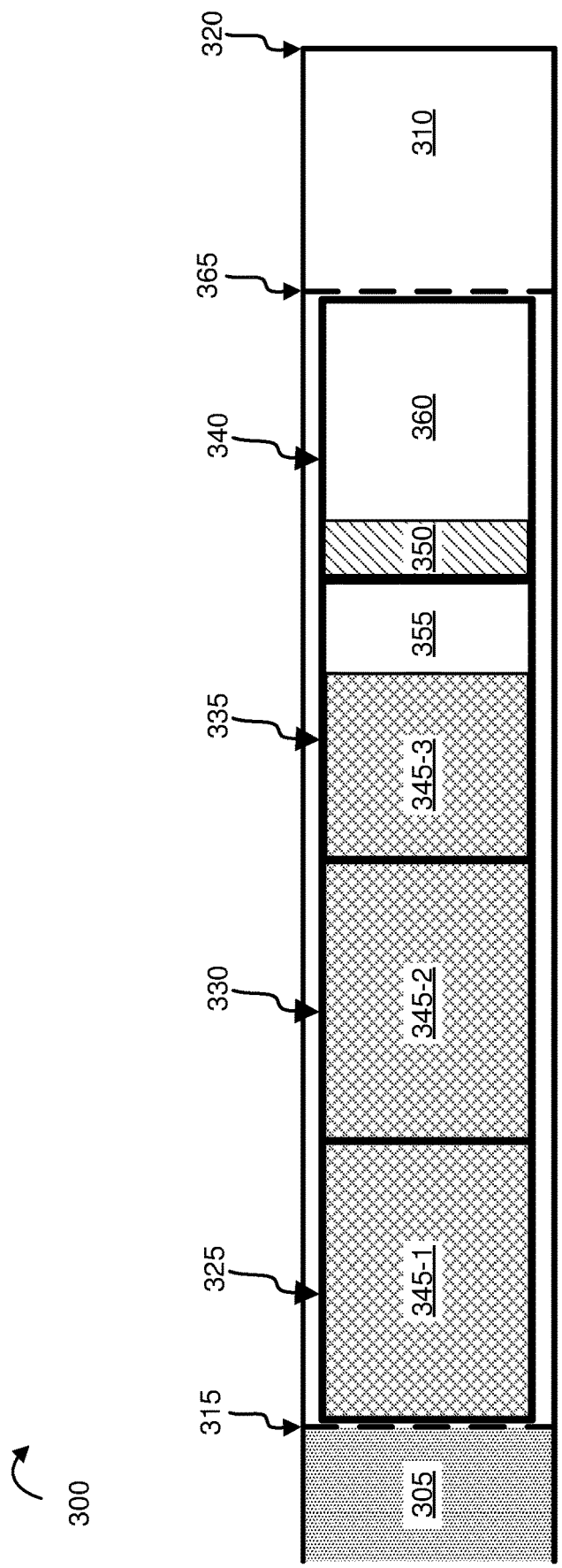
FIG. 3 depicts an example portion of a tape to which indices are written beyond a threshold tape position, in accordance with embodiments of the present disclosure.

FIG. 3 illustrates an example portion of a tape 300 to which indices are written beyond a threshold tape position, in accordance with embodiments of the present disclosure. Data can be written to tape 300 according to method 200 FIG. 2. Although in some embodiments a tape can have thousands of tracks, for simplicity, tape 300 is illustrated as having a single track to which data is written.

Tape 300 includes a beginning of tape (not shown) and an end of tape 320. Tape 300 also includes a threshold position 315, a segment 305 of the tape 300 before the threshold position 315, and a segment 310 of the tape 300 beyond the threshold position 315. The segment 310 includes 4 datasets. A first dataset 325, a second dataset 330, and a third dataset 335 store a full index whose data is divided into 3 parts among those datasets. Particularly, the first dataset 325 stores the first part 345-1 of the full index; the second dataset 330 stores the second part 345-2 of the full index; and the third dataset 335 stores the third part 345-3 of the full index. Accordingly, the full index occupies 3 datasets. Since the third part 345-3 of the full index does not fill the third dataset 335, the remaining storage capacity of the third dataset 335 includes invalid data 355.

The fourth dataset 340 includes an incremental index 350. Since the incremental index 350 does not fill the fourth dataset 340, the remaining storage capacity of the fourth dataset 340 includes invalid data 360. The tape 300 also includes a target write position 365.

As demonstrated in FIG. 3, embodiments of the present disclosure can provide increased benefit as the size of a full index increases. For example, since the full index discussed above occupies 3 datasets, the segment 310 has insufficient capacity to store more than one full index. However, the segment 310 has sufficient capacity to store a plurality of incremental indices 350. Accordingly, embodiments of the present disclosure can facilitate efficient data storage by permitting an increased number of indices to be written to a tape.

Figure 4:
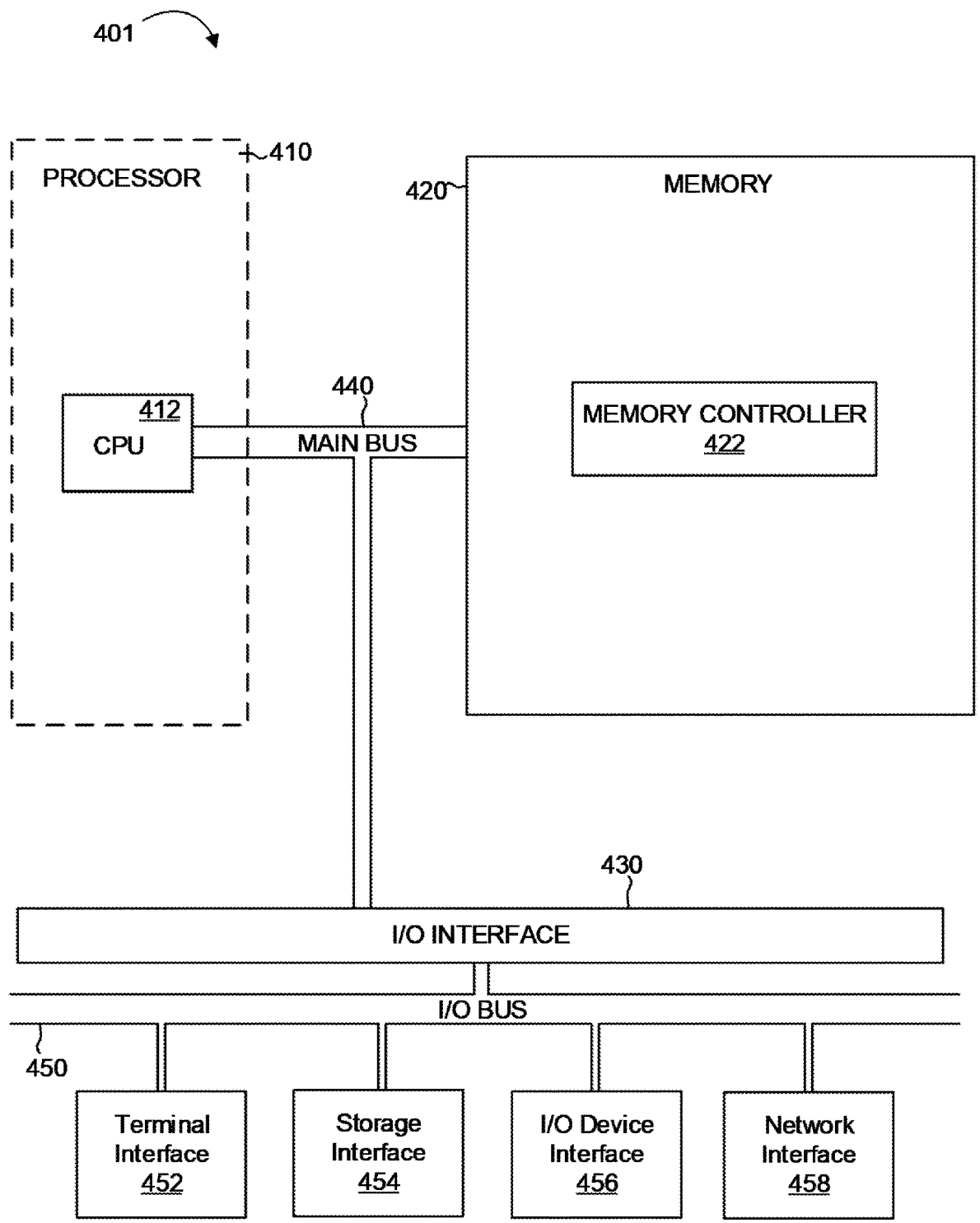
FIG. 4 depicts the representative major components of a computer system that can be used in accordance with embodiments of the present disclosure.

FIG. 4 depicts the representative major components of an exemplary Computer System 401 that can be used in accordance with embodiments of the present disclosure. The particular components depicted are presented for the purpose of example only and are not necessarily the only such variations. The Computer System 401 can comprise a Processor 410, Memory 420, an Input/Output Interface (also referred to herein as I/O or I/O Interface) 430, and a Main Bus 440. The Main Bus 440 can provide communication pathways for the other components of the Computer System 401. In some embodiments, the Main Bus 440 can connect to other components such as a specialized digital signal processor (not depicted).

The Processor 410 of the Computer System 401 can be comprised of one or more CPUs 412. The Processor 410 can additionally be comprised of one or more memory buffers or caches (not depicted) that provide temporary storage of instructions and data for the CPU 412. The CPU 412 can perform instructions on input provided from the caches or from the Memory 420 and output the result to caches or the Memory 420. The CPU 412 can be comprised of one or more circuits configured to perform one or methods consistent with embodiments of the present disclosure. In some embodiments, the Computer System 401 can contain multiple Processors 410 typical of a relatively large system. In other embodiments, however, the Computer System 401 can be a single processor with a singular CPU 412.

The Memory 420 of the Computer System 401 can be comprised of a Memory Controller 422 and one or more memory modules for temporarily or permanently storing data (not depicted). In some embodiments, the Memory 420 can comprise a random-access semiconductor memory, storage device, or storage medium (either volatile or non-volatile) for storing data and programs. The Memory Controller 422 can communicate with the Processor 410, facilitating storage and retrieval of information in the memory modules. The Memory Controller 422 can communicate with the I/O Interface 430, facilitating storage and retrieval of input or output in the memory modules. In some embodiments, the memory modules can be dual in-line memory modules.

The I/O Interface 430 can comprise an I/O Bus 450, a Terminal Interface 452, a Storage Interface 454, an I/O Device Interface 456, and a Network Interface 458. The I/O Interface 430 can connect the Main Bus 440 to the I/O Bus 450. The I/O Interface 430 can direct instructions and data from the Processor 410 and Memory 420 to the various interfaces of the I/O Bus 450. The I/O Interface 430 can also direct instructions and data from the various interfaces of the I/O Bus 450 to the Processor 410 and Memory 420. The various interfaces can comprise the Terminal Interface 452, the Storage Interface 454, the I/O Device Interface 456, and the Network Interface 458. In some embodiments, the various interfaces can comprise a subset of the aforementioned interfaces (e.g., an embedded computer system in an industrial application may not include the Terminal Interface 452 and the Storage Interface 454).

Logic modules throughout the Computer System 401—including but not limited to the Memory 420, the Processor 410, and the I/O Interface 430—can communicate failures and changes to one or more components to a hypervisor or operating system (not depicted). The hypervisor or the operating system can allocate the various resources available in the Computer System 401 and track the location of data in Memory 420 and of processes assigned to various CPUs 412. In embodiments that combine or rearrange elements, aspects of the logic modules' capabilities can be combined or redistributed. These variations would be apparent to one skilled in the art.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy, and compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
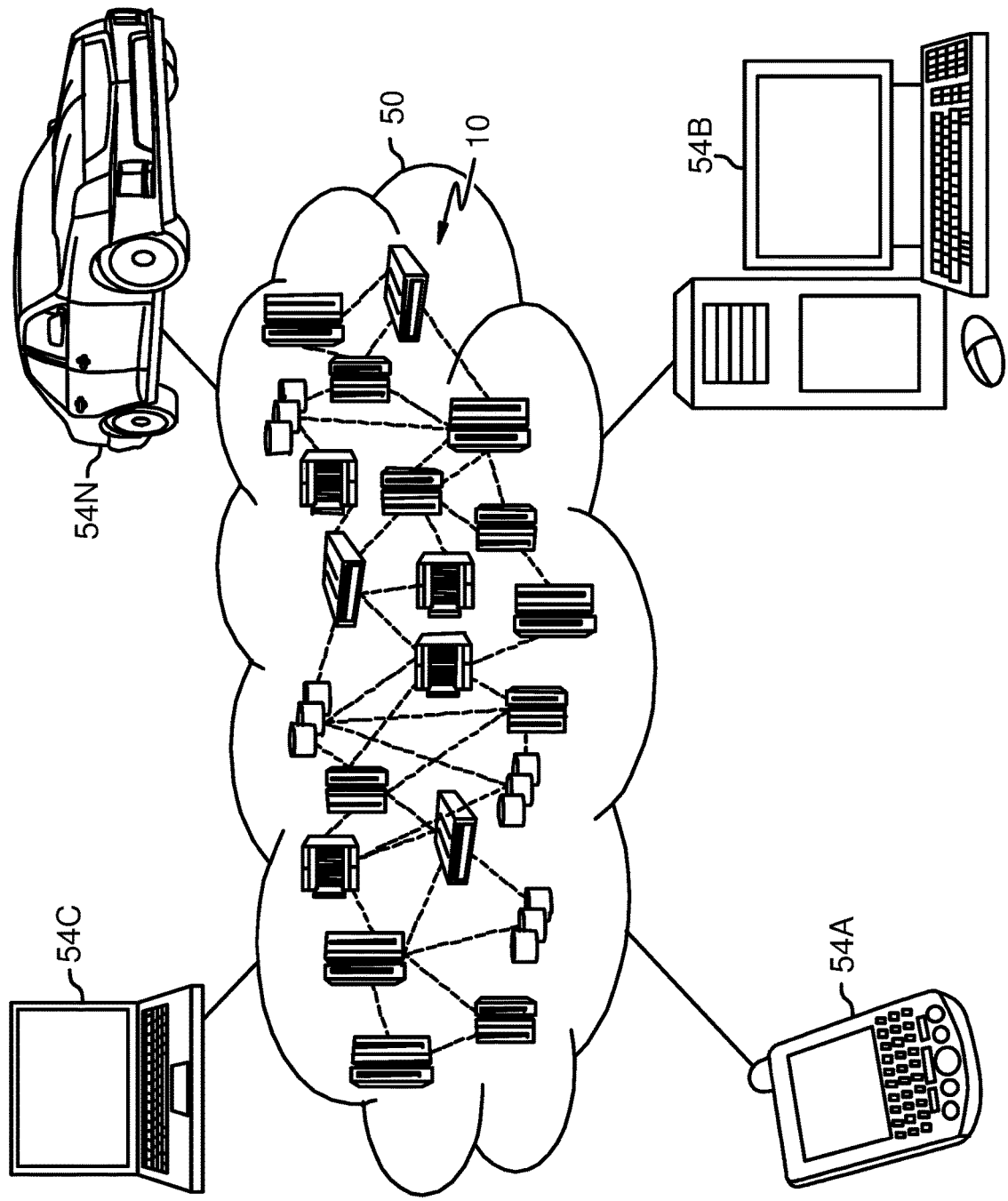
FIG. 5 depicts a cloud computing environment according to embodiments of the present disclosure.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N can communicate. Nodes 10 can communicate with one another. They can be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
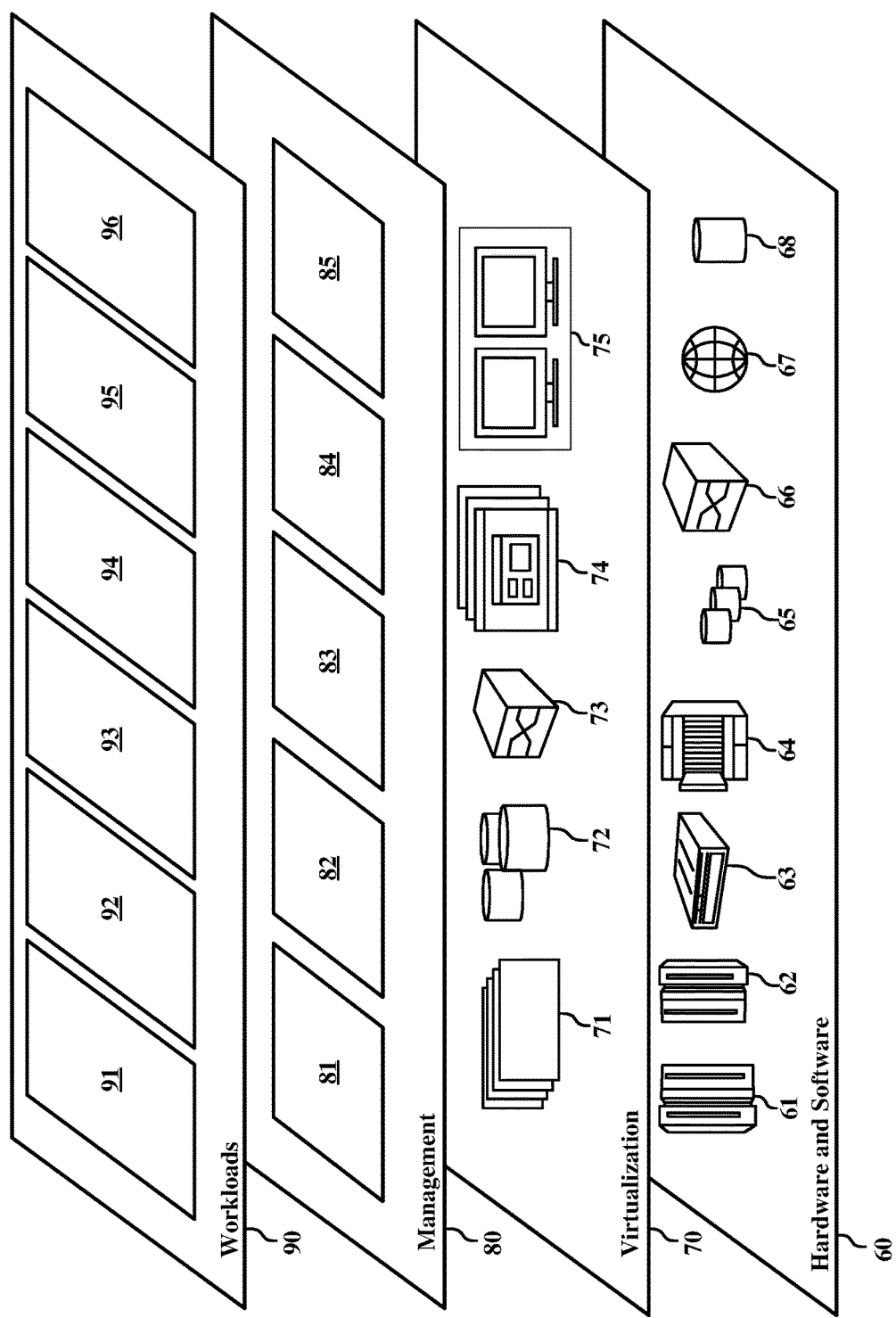
FIG. 6 depicts abstraction model layers according to embodiments of the present disclosure.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities can be provided: virtual servers 71; virtual storage 72; virtual networks 73, including virtual private networks; virtual applications and operating systems 74; and virtual clients 75.

In one example, management layer 80 can provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources can comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment can be utilized. Examples of workloads and functions which can be provided from this layer include: mapping and navigation 91; software development and lifecycle management 92; virtual classroom education delivery 93; data analytics processing 94; transaction processing 95; and index management logic 96.

As discussed in more detail herein, it is contemplated that some or all of the operations of some of the embodiments of methods described herein can be performed in alternative orders or may not be performed at all; furthermore, multiple operations can occur at the same time or as an internal part of a larger process.

The present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method comprising:
obtaining write information corresponding to an index to be written to a tape, the write information comprising a target write position on the tape for the index;
making a first determination that the target write position is beyond a threshold position on the tape;
obtaining index information comprising a size of a full index stored on the tape;
making a second determination that the size of the full index exceeds a size of one dataset; and
writing, in response to making the first determination and the second determination, the index to the tape, the writing being in a first position beyond the threshold position,
wherein the index is an incremental index.

2. The computer-implemented method of claim 1, wherein the index information further comprises a number of consecutively stored indices on the tape, and
wherein the writing is further in response to the number not exceeding a threshold number.

3. The computer-implemented method of claim 1, wherein data written to the tape beyond the threshold position is selected from the group consisting of: an incremental index and a full index.

4. The computer-implemented method of claim 1, wherein the index comprises metadata.

5. The computer-implemented method of claim 1, wherein the obtaining the write information is performed in response to an operation selected from the group consisting of: deleting a file stored on the tape and renaming a file stored on the tape.

6. The computer-implemented method of claim 1, wherein the write information further comprises an indication for unmounting the tape; and
writing, in response to the indication, a full index to the tape in a second position beyond the threshold position.

7. The computer-implemented method of claim 6, further comprising storing an indicator of a size of the full index.

8. A system comprising:
one or more processors; and
one or more computer-readable storage media storing program instructions which, when executed by the one or more processors, are configured to cause the one or more processors to perform a method comprising:

obtaining write information corresponding to an index to be written to a tape, the write information comprising a target write position on the tape for the index;

making a first determination that the target write position is beyond a threshold position on the tape;

obtaining index information comprising a size of a full index stored on the tape;

making a second determination that the size of the full index exceeds a size of one dataset; and writing, in response to making the first determination and the second determination, the index to the tape, the writing being in a first position beyond the threshold position, wherein the index is an incremental index.

9. The system of claim 8, wherein the index information further comprises a number of consecutively stored indices on the tape, and wherein the writing is further in response to the number not exceeding a threshold number.

10. The system of claim 8, wherein data written to the tape beyond the threshold position is selected from the group consisting of: an incremental index and a full index.

11. The system of claim 8, wherein the index comprises metadata.

12. The system of claim 8, wherein the obtaining the write information is performed in response to an operation selected from the group consisting of: deleting a file stored on the tape and renaming a file stored on the tape.

13. The system of claim 8, wherein the write information further comprises an indication for unmounting the tape; and writing, in response to the indication, a full index to the tape in a second position beyond the threshold position.

14. The system of claim 13, further comprising storing an indicator of a size of the full index.

15. A computer program product comprising one or more computer readable storage media, and program instructions collectively stored on the one or more computer readable storage media, the program instructions executable by one or more processors to cause the one or more processors to perform a method comprising:

obtaining write information corresponding to an index to be written to a tape, the write information comprising a target write position on the tape for the index;

making a first determination that the target write position is beyond a threshold position on the tape;

obtaining index information comprising a size of a full index stored on the tape;

making a second determination that the size of the full index exceeds a size of one dataset; and writing, in response to making the first determination and the second determination, the index to the tape, the writing being in a first position beyond the threshold position, wherein the index is an incremental index.

16. The computer program product of claim 15, wherein the index information further comprises a number of consecutively stored indices on the tape, and wherein the writing is further in response to the number not exceeding a threshold number.

17. The computer program product of claim 15, wherein data written to the tape beyond the threshold position is selected from the group consisting of: an incremental index and a full index.

18. The computer program product of claim 15, wherein the index comprises metadata.

19. The computer program product of claim 15, wherein the obtaining the write information is performed in response to an operation selected from the group consisting of: deleting a file stored on the tape and renaming a file stored on the tape.

20. The computer program product of claim 15, wherein the write information further comprises an indication for unmounting the tape; and writing, in response to the indication, a full index to the tape in a second position beyond the threshold position.

\* \* \* \* \*